(12) United States Patent
Ishikawa et al.

(10) Patent No.: US 8,070,342 B2
(45) Date of Patent: Dec. 6, 2011

(54) ELECTRONIC APPARATUS AND ILLUMINATING DEVICE HAVING A TRANSLUCENT MEMBER WITH INCIDENT LINES OF PROTRUSIONS

(75) Inventors: Takehisa Ishikawa, Kawasaki (JP);
Yoshifumi Kajiwara, Kawasaki (JP);
Hiroaki Sakashita, Kawasaki (JP);
Yoshiya Matsumoto, Kawasaki (JP);
Kazunori Maruyama, Kawasaki (JP);
Atsuko Yamamoto, Kawasaki (JP);
Hiroyuki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 93 days.

(21) Appl. No.: 11/941,539

(22) Filed: Nov. 16, 2007

(65) Prior Publication Data

US 2008/0144314 A1    Jun. 19, 2008

(30) Foreign Application Priority Data

Dec. 15, 2006  (JP) .................... 2006-338584

(51) Int. Cl.
*G02B 5/02* (2006.01)

(52) U.S. Cl. ......... 362/558; 362/621; 362/555; 362/339

(58) Field of Classification Search .......... 362/555, 362/558, 339, 330, 561, 97.1–97.4, 246, 362/600–634; 385/146; 359/599, 831, 837
See application file for complete search history.

(56) References Cited

U.S. PATENT DOCUMENTS

| 7,575,358 B2 * | 8/2009 | Suzuki et al. ................. 362/613 |
| 2008/0055881 A1 * | 3/2008 | O'Neill et al. .................. 362/19 |
| 2009/0040424 A1 * | 2/2009 | Chang ............................ 349/64 |

FOREIGN PATENT DOCUMENTS

| JP | 57-145225 U | | 9/1982 |
| JP | 10-199316 | * | 7/1998 |
| JP | 10-199316 A | | 7/1998 |
| JP | 2003-281912 A | | 10/2003 |
| JP | 2006-228589 A | | 8/2006 |
| WO | 2006/087879 A1 | | 8/2006 |
| WO | WO2006/087879 | * | 8/2006 |
| WO | WO 2006087879 A1 | * | 8/2006 |

OTHER PUBLICATIONS

Japan Patent Office; Official Action mailed in connection with JP patent application 2006-338584 on Mar. 1, 2011. English-language translation provided.

* cited by examiner

*Primary Examiner* — Ismael Negron
(74) *Attorney, Agent, or Firm* — Fujitsu Patent Center (57) ABSTRACT

A light emitting element is mounted on the surface of a board. The light emitting element emits light. The light passes through a translucent optical member. The light enters the translucent optical member through a incident surface. The lines of protrusions make the incident surface jagged. The jagged surface resulting from the protrusions enables diffusion of the light entering through the incident surface. The light spreads along the surface of the board. Simultaneously, the emitted light is partly reflected on the incident surface. The reflected light is reflected on a reflecting surface placed behind the light emitting element. The reflected light then enters the translucent optical member. The translucent optical member is thus allowed to illuminate over a wide range with a sufficient brightness. An impressive illumination can be realized.

10 Claims, 8 Drawing Sheets

ELECTRONIC APPARATUS AND ILLUMINATING DEVICE HAVING A TRANSLUCENT MEMBER WITH INCIDENT LINES OF PROTRUSIONS

BACKGROUND OF THE INVENTION

1. Field of the Invention

The present invention relates to an electronic apparatus such as a cellular or mobile phone terminal. In particular, the present invention relates to an electronic apparatus including a light emitting element incorporated in an enclosure.

2. Description of the Prior Art

A light emitting element such as a light-emitting diode (LED) is incorporated in a mobile phone terminal. Light emitted from the LED leaks at the surface of the mobile phone terminal. Light blinks in response to the receipt of a call, in synchronization with music, and the like, for example.

The light emitted from the LED has a high directivity. The LED cannot illuminate over a wide range. In the case where two or more LEDs are utilized, each LED makes a spot. The LEDs cannot illuminate uniformly over a wide range. Impressive illumination cannot thus be obtained.

SUMMARY OF THE INVENTION

It is accordingly an object of the present invention to provide an electronic apparatus and an illuminating device, allowing an optical member to illuminate over a wide range with a sufficient brightness.

According to the present invention, there is provided an illuminating device comprising: a board; a light emitting element mounted on the surface of the board, the light emitting element having an optical path parallel to the surface of the board; a translucent optical member placed on the optical path of the light emitting element, the translucent optical member having an incident surface opposed to the front of the light emitting element; lines of protrusions formed on the incident surface of the translucent optical member, the protrusions extending in a vertical direction perpendicular to the surface of the board; and a light collector member placed along the surface of the board, the light collector member having a reflecting surface opposed to the back of the light emitting element.

The light emitting element emits light in the illuminating device. The light passes through the translucent optical member. The light enters the translucent optical member through the incident surface. The lines of protrusions make the incident surface jagged. The jagged surface resulting from the protrusions enables diffusion of the light entering through the incident surface. The light spreads along the surface of the board. Simultaneously, the emitted light is partly reflected on the incident surface. The reflected light is reflected on the reflecting surface. The reflected light then enters the translucent optical member. The translucent optical member is thus allowed to illuminate over a wide range with a sufficient brightness. An impressive illumination can be realized.

The reflecting surface may get closer to the translucent optical member as the position gets farther from the light emitting element in the illuminating device. The reflecting surface serves to direct the light uniformly toward the translucent optical member. Fine particles may be dispersed in the translucent optical member. A light-emitting diode (LED) may be employed as the light emitting element. An opaque film may be formed on the surface of the translucent optical member in a predetermined pattern.

The illuminating device may be incorporated in an electronic apparatus. The electronic apparatus may comprise: an enclosure; a board incorporated in the enclosure; a light emitting element mounted on the surface of the board, the light emitting element having an optical path parallel to the surface of the board; a translucent optical member placed on the optical path of the light emitting element, the translucent optical member having an incident surface opposed to the front of the light emitting element; lines of protrusions formed on the incident surface of the translucent optical member, the protrusions extending in a vertical direction perpendicular to the surface of the board; and a light collector member placed along the surface of the board, the light collector member having a reflecting surface opposed to the back of the light emitting element. The translucent optical member is allowed to illuminate over a wide range with a sufficient brightness in the electronic apparatus in the same manner as described above.

According to a second aspect of the present invention, there is provided an illuminating device comprising: a first board; a first light emitting element mounted on a first surface of the first board, the first light emitting element having a first optical path parallel to the first surface of the first board; a first translucent optical piece placed on the first optical path, the first translucent optical piece having an incident surface opposed to the front of the first light emitting element; a second board having an opposed surface opposed to a second surface of the first board; a second light emitting element mounted on the opposed surface of the second board, the second light emitting element having a second optical path parallel to the first optical path; a second translucent optical piece placed on the second optical path, the second translucent optical piece having an incident surface opposed to the front of the second light emitting element; and an operating member placed in a space between the first optical path and the second optical path, the operating member protruding outward from the edges of the first and second boards along the first and second optical paths.

The operating member divides a space into two parts, a first room and a second room, in the illuminating device, for example. The first light emitting element emits light in the first room. The second light emitting element emits light in the second room. The first and second translucent optical pieces are thus illuminated along the front and back sides of the operating member, respectively. This results in an enhanced appearance. The first and second translucent optical pieces may integrally be molded as a one-piece component, for example.

The illuminating device may further comprise lines of protrusions formed on the incident surface of the first translucent optical piece, the protrusions extending in the vertical direction perpendicular to the first surface of the first board. Likewise, the illuminating device may further comprise lines of protrusions formed on the incident surface of the second translucent optical piece, the protrusions extending in the vertical direction perpendicular to the opposed surface of the second board. The lines of protrusions make the incident surfaces jagged. The jagged surfaces resulting from the protrusions enable diffusion of the light entering through the incident surfaces. The light spreads along the surfaces of the first and second boards. The first and second translucent optical pieces are thus allowed to illuminate over a wide range with a sufficient brightness.

The illuminating device may further comprise: a first light collector member placed along the first surface of the first board, the first light collector member having a reflecting surface opposed to the back of the first light emitting element;

and a second light collector member placed along the opposed surface of the second board, the second light collector member having a reflecting surface opposed to the back of the second light emitting member. The light is reflected on the incident surfaces. The reflected light is reflected on the reflecting surfaces. The reflected light is allowed to enter the first and second translucent optical pieces. The first and second translucent optical pieces are thus allowed to illuminate over a wide range with a sufficient brightness.

The reflecting surface of the first light collector member may get closer to the first translucent optical piece as the position gets farther from the first light emitting element. Likewise, the reflecting surface of the second light collector member may get closer to the second translucent optical piece as the position gets farther from the second light emitting element. The reflecting surfaces serve to direct the light uniformly toward the translucent optical pieces. Fine particles may be dispersed in the first and second translucent optical pieces. A light-emitting diode (LED) may be employed as the first and second light emitting elements. An opaque film may be formed in a predetermined pattern on the surface of each of the first and second translucent optical pieces.

The illuminating device may be incorporated in an electronic apparatus. The electronic apparatus may comprise: an enclosure; a first board incorporated in the enclosure; a first light emitting element mounted on a first surface of the first board, the first light emitting element having a first optical path parallel to the first surface of the first board; a first translucent optical piece placed on the first optical path, the first translucent optical piece having an incident surface opposed to the front of the first light emitting element; a second board incorporated in the enclosure, the second board having an opposed surface opposed to a second surface of the first board; a second light emitting element mounted on the opposed surface of the second board, the second light emitting element having a second optical path parallel to the first optical path; a second translucent optical piece placed on the second optical path, the second translucent optical piece having an incident surface opposed to the front of the second light emitting element; and an operating member placed in a space between the first optical path and the second optical path, the operating member protruding outward from the edges of the first and second boards along the first and second optical paths.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
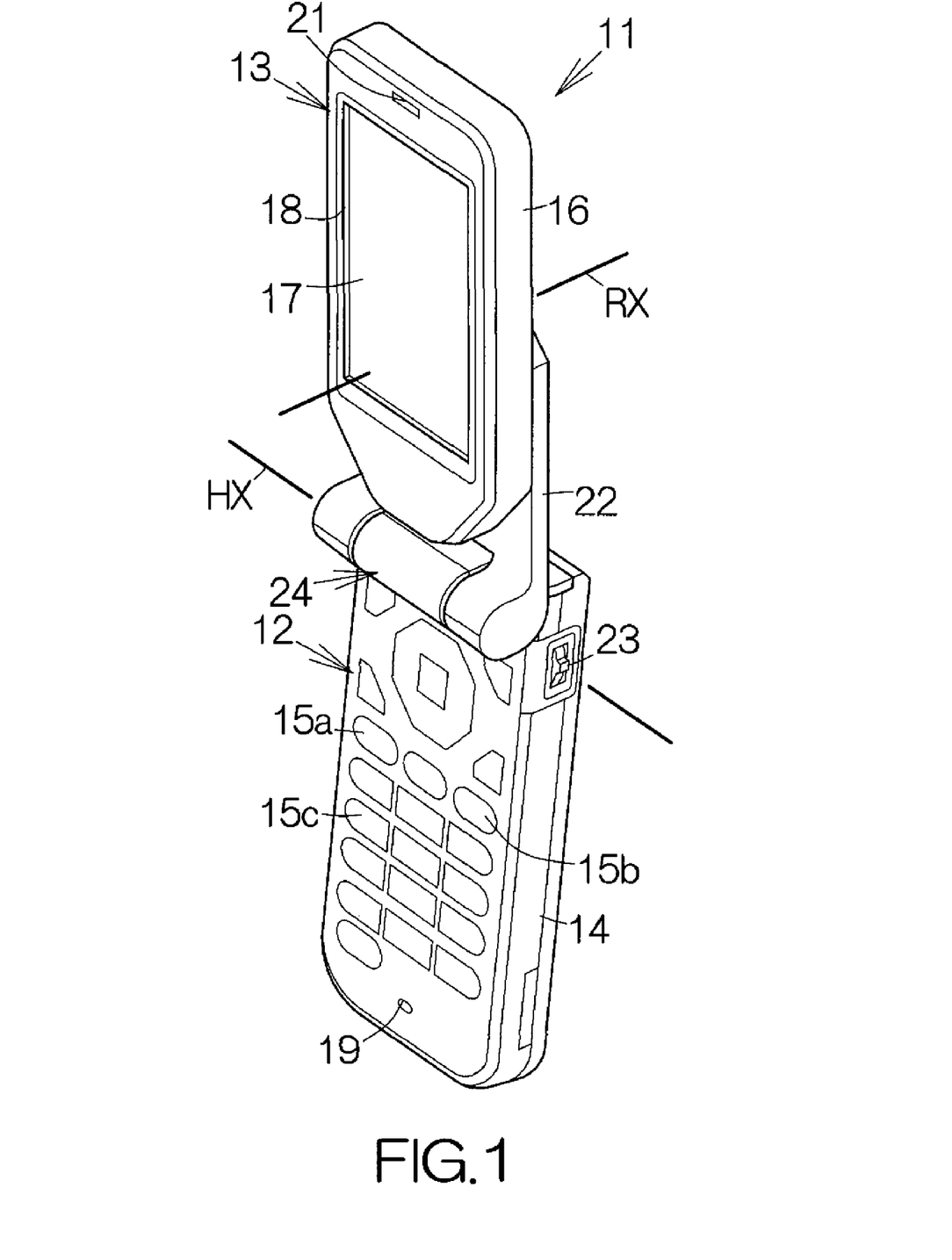
FIG. 1 is a perspective view schematically illustrating a cellular or mobile phone terminal as a specific example of an electronic apparatus according to the present invention.

FIG. 1 schematically illustrates a cellular or mobile phone terminal 11 of the clamshell type as an example of an electronic apparatus according to an embodiment of the present invention. The mobile phone terminal 11 includes a main apparatus 12 and a display unit 13. The main apparatus 12 includes a main body enclosure 14 serving as a first enclosure. A printed circuit board, not shown, is incorporated in the main body enclosure 14. Processing circuits, such as a central processing unit (CPU) and a memory, are mounted on the printed circuit board in a conventional manner. Keypads, such as an on-hook keypad 15a, an off-hook keypad 15b, numeric keypads 15c, and the like, are embedded in the flat front surface of the main apparatus 12. The CPU executes various processing in response to the manipulation of the keypads. The main body enclosure 14 may be molded from a reinforced resin material such as acrylonitrile butadiene styrene (ABS), for example.

The display unit 13 includes a display enclosure 16 serving as a second enclosure. A flat display panel module such as a liquid crystal display (LCD) panel module 17 is incorporated in the display enclosure 16. A window opening 18 is defined in the flat front surface of the display enclosure 16. The LCD panel module 17 defines a screen exposed in the window opening 18. Various texts and graphics are displayed on the screen of the LCD panel module 17 in response to the operation of the CPU. The display enclosure 16 may be molded from a reinforced resin material such as acrylonitrile butadiene styrene (ABS), for example.

A microphone hole 19 is defined in the flat front surface of the main body enclosure 14. A microphone is placed within the microphone hole 19. A speaker hole 21 is defined in the flat front surface of the display enclosure 16. A speaker is placed within the speaker hole 21. The user of the mobile phone terminal 11 speaks to the microphone during telephone conversation. The speaker reproduces the voice of the other party. An operating member, namely an operating switch 23 is placed on the side surface of the main body enclosure 14.

A hinge bracket 22 is coupled to the main body enclosure 14. A hinge 24 is utilized to couple the hinge bracket 22. The hinge 24 allows relative rotation around a first rotation axis HX between the main body enclosure 14 and the hinge bracket 22. The first rotation axis HX is designed to extend in parallel with the flat front surface of the main body enclosure 14.

The back surface of the display enclosure 16 is superposed on the front surface of the hinge bracket 22. The display enclosure 16 is coupled to the hinge bracket 22 for relative rotation around a second rotation axis RX. The second rotation axis RX is designed to extend within an imaginary plane perpendicular to the first rotation axis HX. The second rotation axis RX is also designed to intersect with the front surface of the hinge bracket 22. Here, the intersecting angle is set at 90 degrees between the second rotation axis RX and the front surface of the hinge bracket 22. The display enclosure 16 is in this manner allowed to rotate relative to the main body enclosure 14 around the first rotation axis HX.

When the mobile phone terminal 11 is set in an opened attitude, the main apparatus 12 and the display unit 13 face front. A portrait screen is established in the LCD panel module 17 while the main apparatus 12 is set in a vertical attitude. The user of the mobile phone terminal 11 is allowed to look at the keypads such as the numeric keypads 15c while he/she keeps looking at the portrait screen of the LCD panel module 17. The display enclosure 16 is rotatable around the first rotation axis HX. Such a rotation of the display enclosure 16 enables superposition of the display enclosure 16 on the flat front surface of the main body enclosure 14. The mobile phone terminal 11 thus takes a closed attitude. The mobile phone terminal 11 is set in a folded state in this manner.

Figure 2:
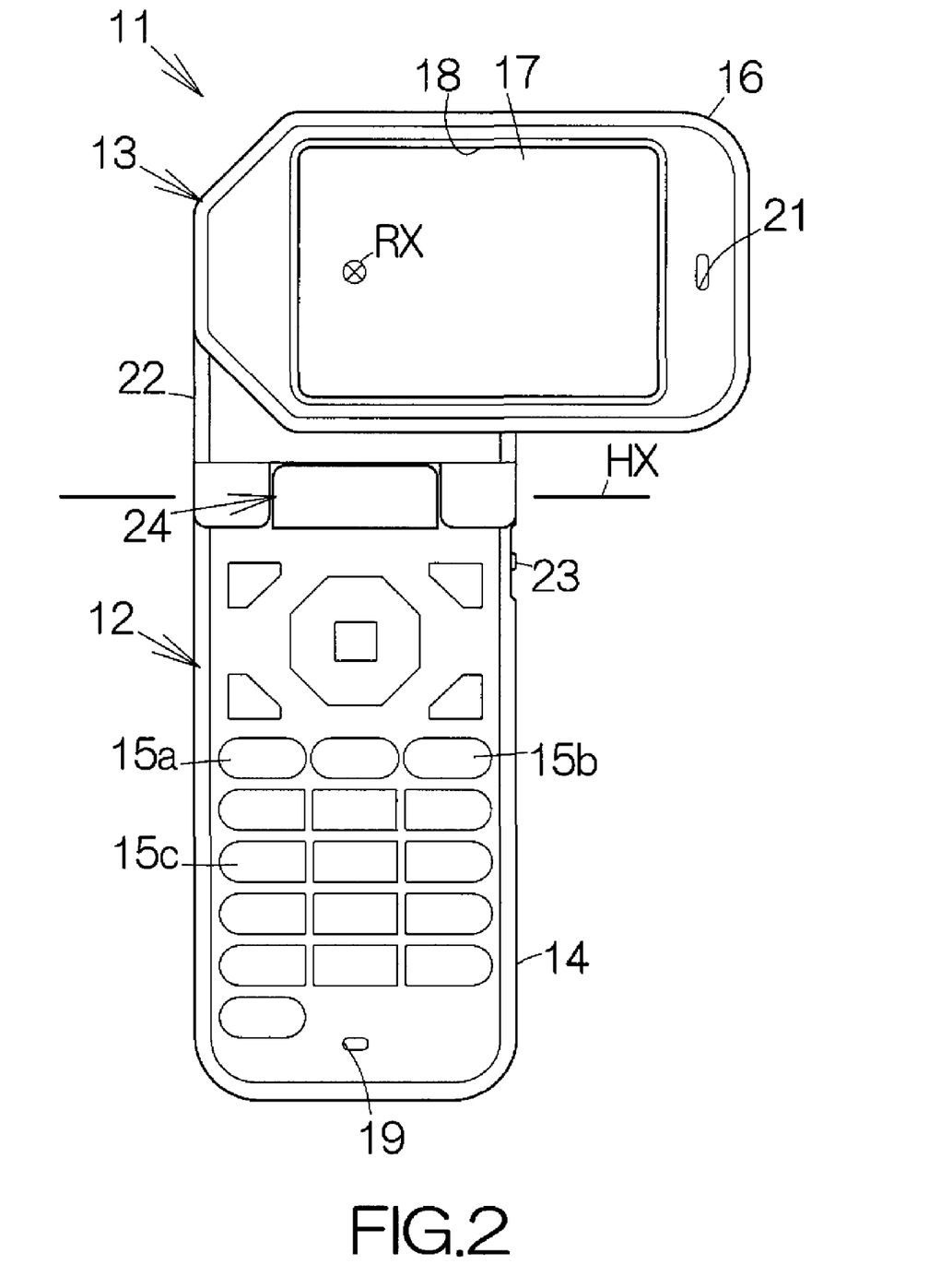
FIG. 2 is a front view schematically illustrating a first pivotal attitude of a display enclosure.
Figure 3:
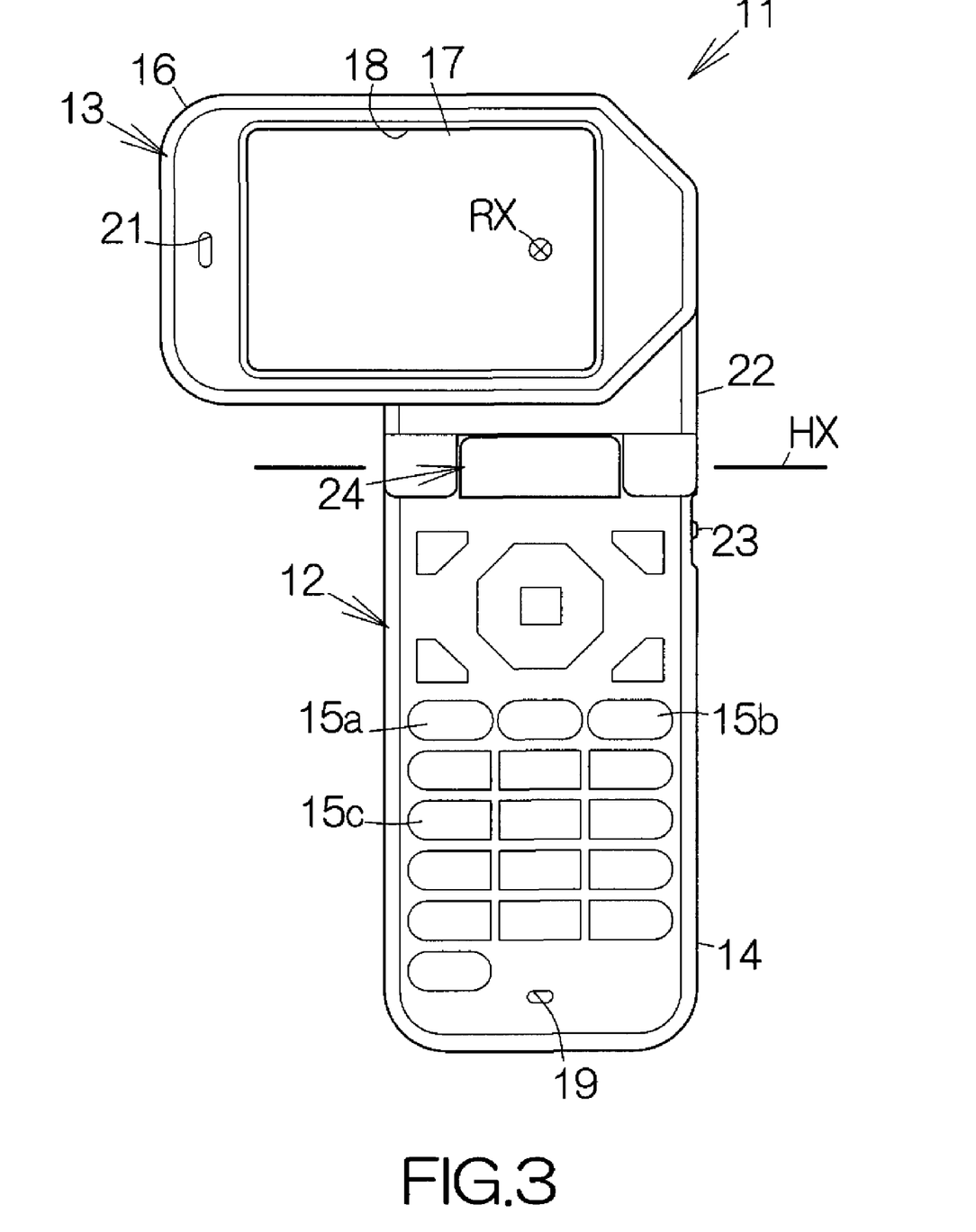
FIG. 3 is a front view schematically illustrating a second pivotal attitude of the display enclosure.

When the mobile phone terminal 11 takes the opened attitude, the display enclosure 16 is allowed to rotate around the second rotation axis RX, for example. When the display enclosure 16 rotates in the clockwise direction, namely a first direction, by the rotation angle of 90 degrees, from the upright attitude where the display panel module 17 provides the portrait screen, as shown in FIG. 2, the display enclosure 16 takes a first pivotal attitude. A landscape screen is established in the LCD panel module 17. When the display enclosure 16 rotates in the anticlockwise direction, namely a second direction, by the rotation angle of 90 degrees, from the upright attitude, the display enclosure 16 takes a second pivotal attitude, as shown in FIG. 3. The landscape screen is established in the LCD panel module 17.

Figure 4:
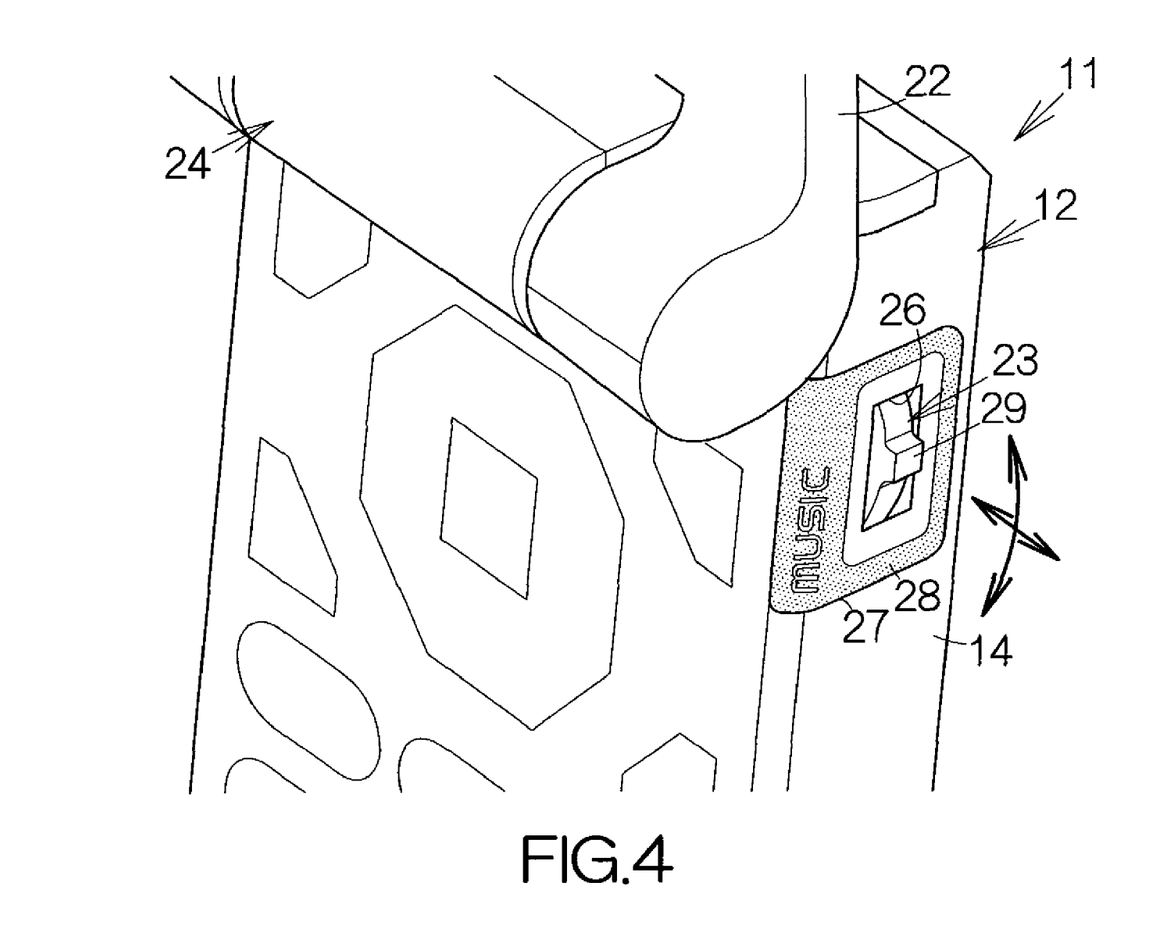
FIG. 4 is an enlarged partial perspective view of the mobile phone terminal for schematically illustrating the structure of a main body enclosure.

As shown in FIG. 4, the operating switch 23 is placed in an opening 26. The opening 26 is defined in a cover 28 fitted in an opening 27. The opening 27 is defined in the side surface of the main body enclosure 14. The cover 28 will be described later in detail. The operating switch 23 includes a lug 29. The operating switch 23 or lug 29 is designed to swing around a rotation axis perpendicular to the flat front surface of the main body enclosure 14. In addition, the operating switch 23 is designed to move in and out of the opening 26 in parallel with the flat front surface of the main body enclosure 14. The mobile phone terminal 11 allows operations such as playing, stopping and searching music in response to such movement.

Figure 5:
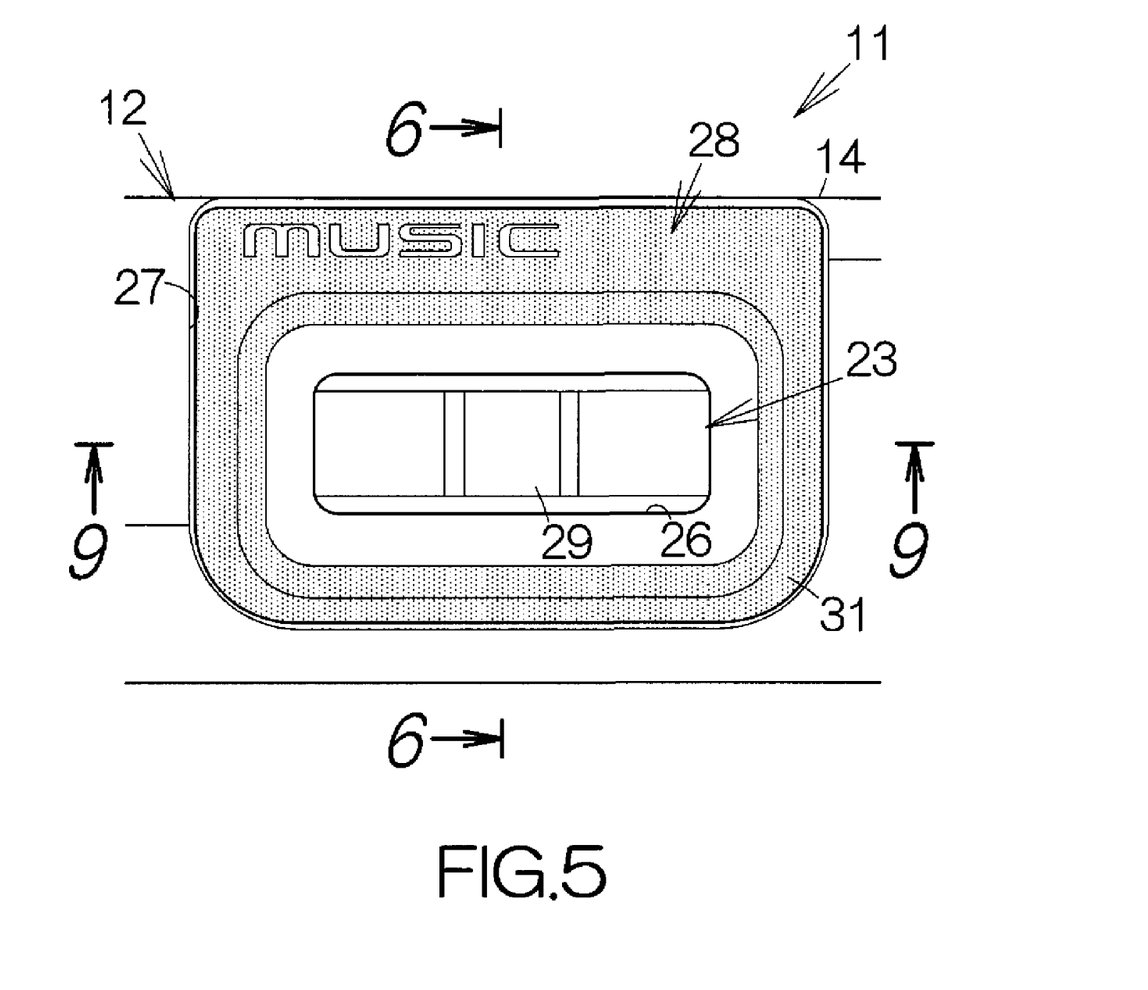
FIG. 5 is an enlarged partial side view of the mobile phone terminal for schematically illustrating the structure of the main body enclosure.

The cover 28 is molded from a resin material such as polycarbonate, for example. Fine particles of opacifier are dispersed in the cover 28, for example. The cover 28 is thus opaque. As shown in FIG. 5, an opaque film 31 having no optical translucency is formed on the surface of the cover 28 in a predetermined pattern. The opaque film 31 is made of a silver-colored aluminum film, for example. Formation of the opaque film 31 is omitted at an area adjacent to the operating switch 23 or along the edge of the opening 26. An evaporation coating of aluminum is applied to the surface of the cover 28 to form the opaque film 31, for example. An aluminum film is then removed from the area adjacent to the opening 26 based on irradiation of a laser. The cover 28 serves as a translucent optical member according to the present invention.

Figure 6:
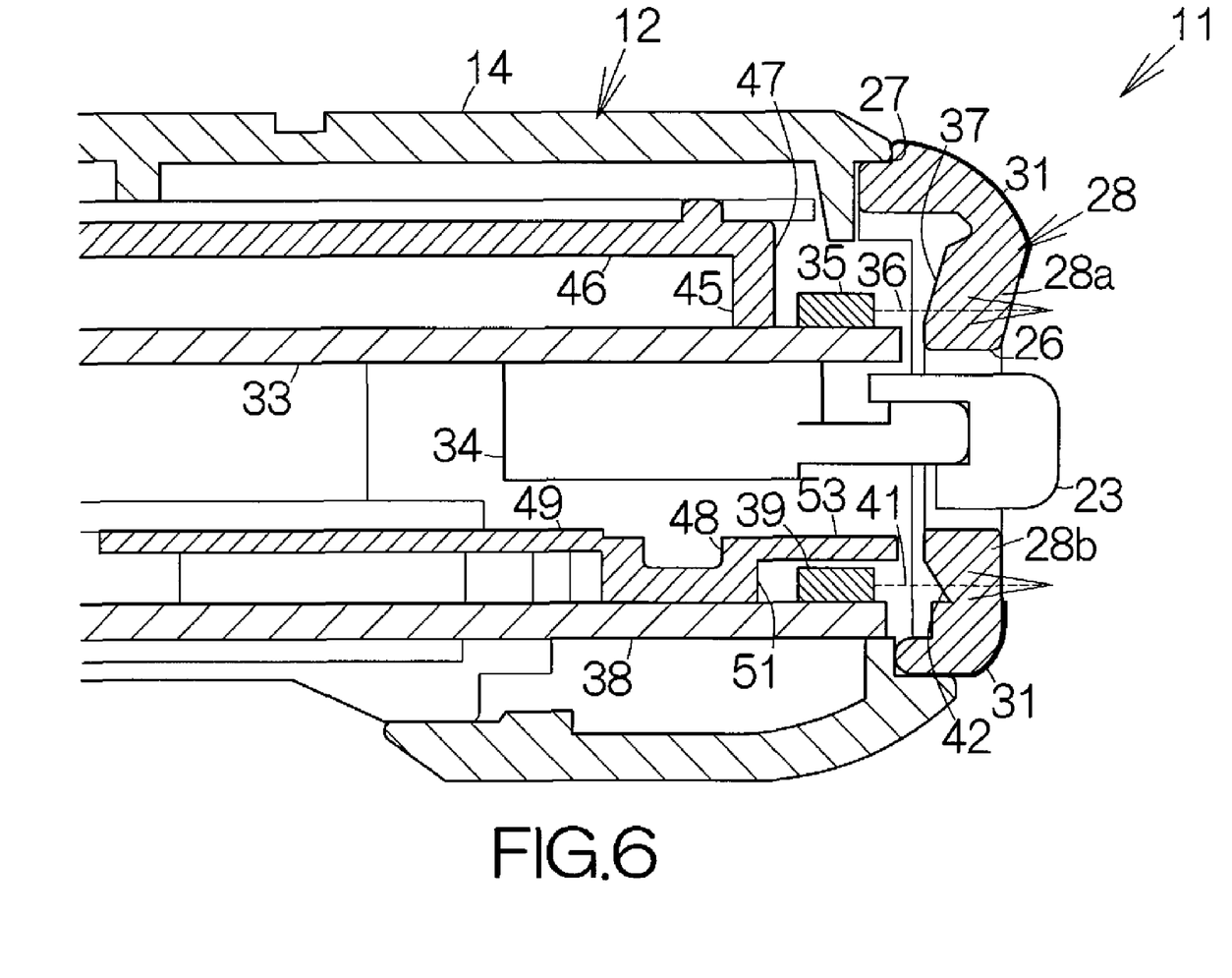
FIG. 6 is an enlarged partial sectional view taken along the line 6-6 in FIG. 5.

As shown in FIG. 6, a first printed wiring board 33 serving as a first board according to the invention is incorporated in the main body enclosure 14. A switch element 34 is mounted on the back surface of the first printed wiring board 33. The aforementioned operating switch 23 is coupled to the switch element 34. The operating switch 23 protrudes outward from the edge of the first printed wiring board 33. A first light-emitting diode (LED) 35 serving as a first light emitting element is mounted on the front surface of the first printed wiring board 33. The first LED 35 has a first optical path 36 extending along a line parallel to the front surface of the first printed wiring board 33. The cover 28 includes a first translucent optical piece 28a placed on the first optical path 36. An incident surface 37 is defined on the inward surface of the first translucent optical piece 28a. The first LED 35 and the incident surface 37 are spaced from each other at a predetermined interval.

A second printed wiring board 38 serving as a second board according to the invention is incorporated in the main body enclosure 14. The opposed surface or front surface of the second printed wiring board 38 is opposed to the back surface of the first printed wiring board 33. A second light-emitting diode (LED) 39 serving as a second light emitting element is mounted on the front surface of the second printed wiring board 38. The second LED 39 has a second optical path 41 extending along a line parallel to the front surface of the second printed wiring board 38. The cover 28 includes a second translucent optical piece 28b placed on the second optical path 41. An incident surface 42 is defined on the inward surface of the second translucent optical piece 28b. The second LED 39 and the incident surface 42 are spaced from each other at a predetermined interval. Here, the first and second translucent optical pieces 28a, 28b are integrally molded as one component.

The operating switch 23, the cover 28, the first printed wiring board 33, the second printed wiring board 38, the first LED 35 and the second LED 39 in combination establish an illuminating device according to the present invention. The cover 28 may be supported on the main body enclosure 14. Alternatively, the cover 28 may be supported on the first printed wiring board 33 and/or the second printed wiring board 38.

A first light collector member 45 is placed behind the first LED 35. The first light collector member 45 is defined in a shielding enclosure 46 incorporated in the main body enclosure 14, for example. The shielding enclosure 46 defines a chamber for each semiconductor chip, not shown, mounted on the first printed wiring board 33. The wall of the shielding enclosure 46 may contact a ground layer of the first printed wiring board 33. An electrically-conductive film is formed on the surface of the shielding enclosure 46.

Figure 7:
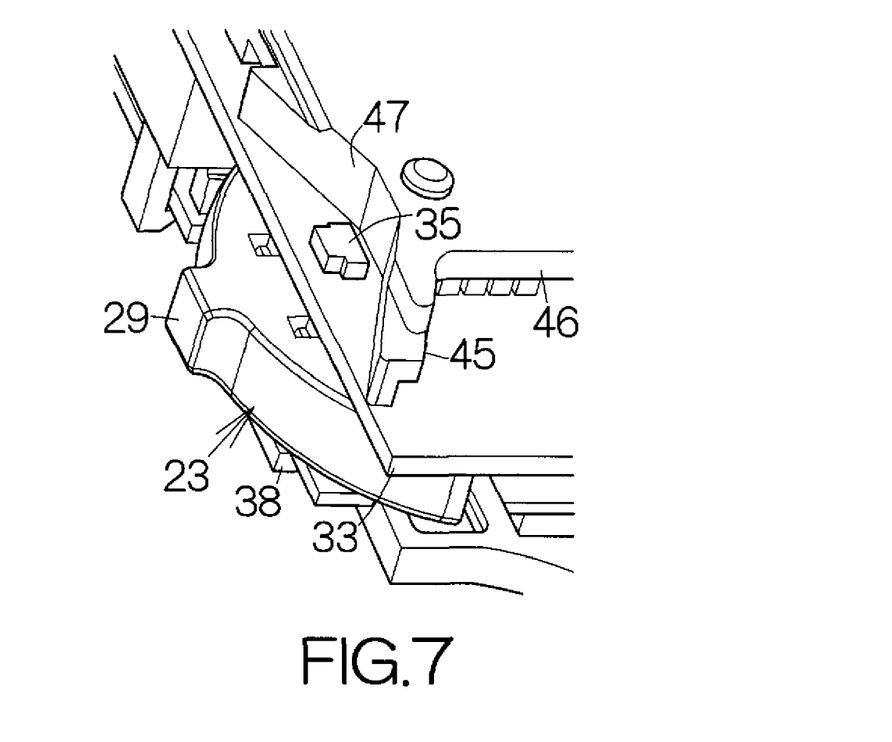
FIG. 7 is an enlarged partial perspective view of the mobile phone terminal for schematically illustrating a light collector member.

Referring also to FIG. 7, the first light collector member 45 includes a reflecting surface 47 opposed to the back surface of the first LED 35. The reflecting surface 47 stands upright from the front surface of the first printed wiring board 33. The reflecting surface 47 gets closer to the cover 28 as the position gets farther from the first LED 35 along the edge of the first printed wiring board 33. The reflecting surface 47 may be colored white or silver, for example.

A second light collector member 48 is likewise placed behind the second LED 39, as shown in FIG. 6. The second light collector member 48 is defined in a frame 49 incorporated in the main body enclosure 14, for example. The frame 49 serves to couple the first printed wiring board 33 with the second printed wiring board 38. The frame 49 may be made of a resin material, for example.

Figure 8:
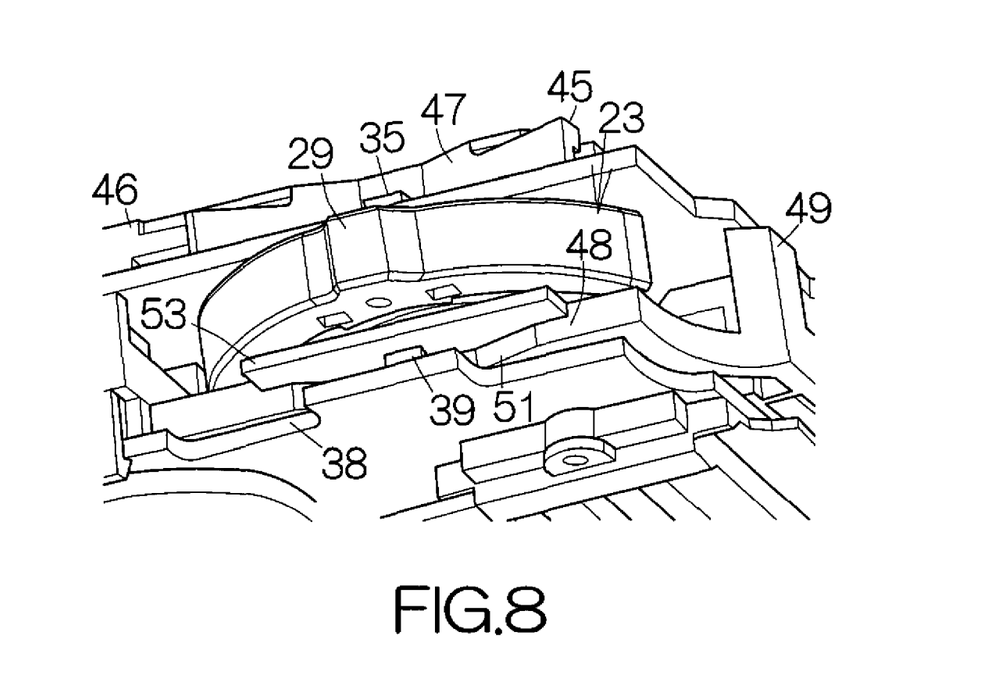
FIG. 8 is an enlarged partial perspective view of the mobile phone terminal for schematically illustrating a light collector member.

Referring also to FIG. 8, the second light collector member 48 includes a reflecting surface 51 opposed to the back surface of the second LED 39. The reflecting surface 51 stands upright from the front surface of the second printed wiring board 38. The reflecting surface 51 gets closer to the cover 28 as the position gets farther from the second LED 39 along the edge of the second printed wiring board 38. The reflecting surface 51 may be colored white or silver, for example. The frame 49 defines a shielding wall 53 extending in parallel with the second printed wiring board 38. The shielding wall 53 serves to block the light emitted from the second LED 39 toward the opening 26 of the cover 28.

Figure 9:
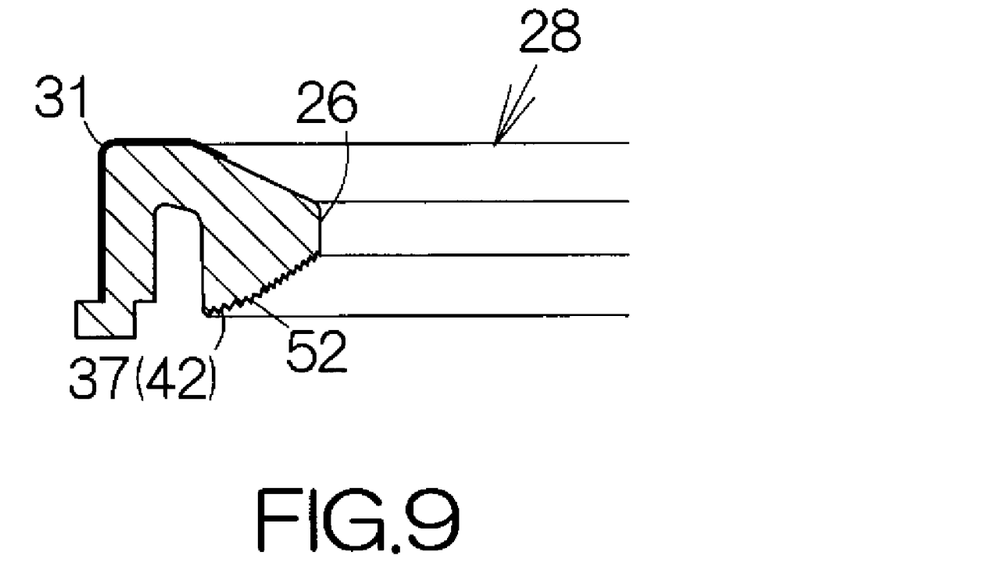
FIG. 9 is an enlarged partial sectional view, taken along the line 9-9 in FIG. 5, for schematically illustrating an optical member.

As shown in FIG. 9, lines of protrusions 52 are formed on the individual incident surfaces 37, 42 of the cover 28. The protrusions 52 are designed to extend in the vertical direction perpendicular to the front surface of the first or second printed wiring board 33, 38. The protrusions 52 make the incident surfaces 37, 42 jagged. The protrusions 52 may extend in parallel with one another at intervals of 0.15 mm, for example. The protrusions 52 may be formed in the process of molding the cover 28. The jagged surface resulting from the protrusions 52 enables diffusion of the incident light penetrating into the incident surfaces 37, 42.

Figure 10:
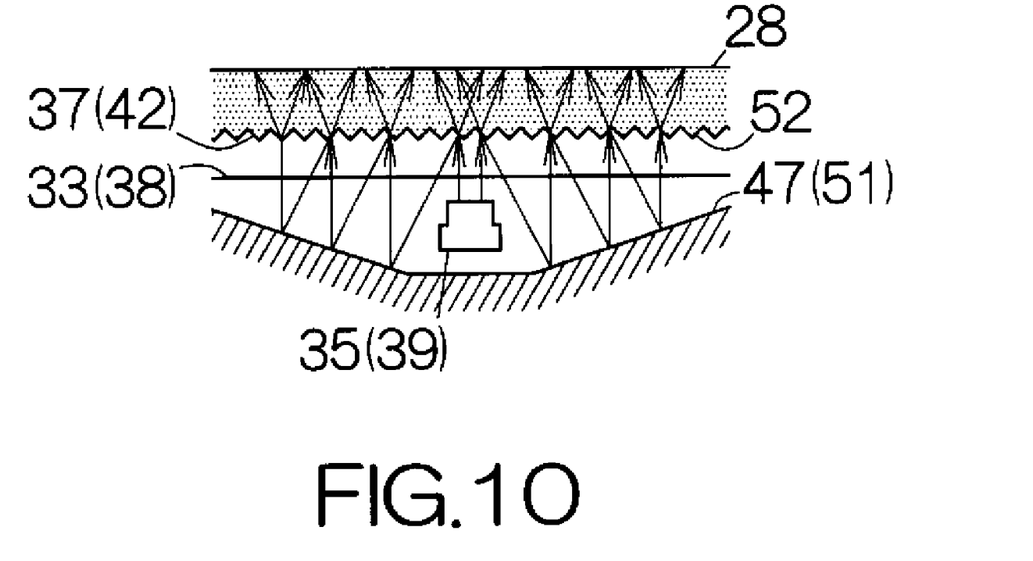
FIG. 10 is a schematic view illustrating diffusion of light.

The operating switch 23 divides a space into two parts, a first room and a second room, for example. The first LED 35 emits light in the first room. The second LED 39 emits light in the second room. The emitted light passes through the cover 28. The light enters the cover 28 through the incident surfaces 37, 42. As shown in FIG. 10, the protrusions 52 serve to diffuse the light. The diffused light spreads along the front surfaces of the first and second printed wiring boards 33, 38. Simultaneously, the emitted light is partly reflected on the incident surfaces 37, 42. The reflected light is reflected on the reflecting surfaces 47, 51. The reflecting surfaces 47, 51 serve to direct the reflected light to the cover 28. The cover 28 is thus allowed to illuminate over a wide range with a sufficient brightness. The cover 28 is illuminated along the front and back sides of the operating switch 23. An impressive illumination can be realized in the mobile phone terminal 11. The mobile phone terminal 11 is allowed to enjoy an enhanced appearance.

The electronic apparatus according to the present invention include, in addition to the aforementioned mobile phone terminal 11, a personal digital assistant (PDA), a notebook personal computer, and the like.

What is claimed is:

1. An illuminating device comprising:
   a board;
   a light-emitting diode mounted on a surface of the board, the light-emitting diode having an optical path parallel to the surface of the board, the light-emitting diode configured to emit light having a high directivity;
   a translucent optical member placed on the optical path of the light-emitting diode, the translucent optical member having an incident surface opposed to a front of the light-emitting diode, the incident surface including lines of protrusions over a range wider than the optical path, the protrusions extending in a vertical direction perpendicular to the surface of the board, the protrusions configured to reflect a part of the light; and
   a light collector member placed along the surface of the board, the light collector member having a reflecting surface opposed to the incident surface at a back of the light-emitting diode the reflecting surface configured to reflect, toward the incident surface, the light reflected from the incident surface over a range wider than the optical path based on jaggedness resulting from the lines of the protrusions.

2. The illuminating device according to claim 1, wherein the reflecting surface gets closer to the translucent optical member as position gets farther from the light-emitting diode.

3. The illuminating device according to claim 1, wherein fine particles are dispersed in the translucent optical member.

4. The illuminating device according to claim 1, further comprising an opaque film having no translucency formed on a surface of the translucent optical member in a predetermined pattern.

5. An electronic apparatus comprising:
   an enclosure;
   a board incorporated in the enclosure;
   a light-emitting diode mounted on a surface of the board, the light-emitting diode having an optical path parallel to the surface of the board, the light-emitting diode configured to emit light having a high directivity;
   a translucent optical member placed on the optical path of the light-emitting diode, the translucent optical member having an incident surface opposed to a front of the light-emitting diode, the incident surface including lines of protrusions over a range wider than the optical path, the protrusions extending in a vertical direction perpendicular to the surface of the board, the protrusions configured to reflect a part of the light; and
   a light collector member placed along the surface of the board, the light collector member having a reflecting surface opposed to the incident surface at a back of the light-emitting diode, the reflecting surface configured to reflect, toward the incident surface, the light reflected from the incident surface over a range wider than the optical path based on jaggedness resulting from the line of the protrusions.

6. The electronic apparatus according to claim 5, wherein the reflecting surface gets closer to the translucent optical member as position gets farther from the light-emitting diode.

7. The electronic apparatus according to claim 5, wherein fine particles are dispersed in the translucent optical member.

8. The electronic apparatus according to claim 5, further comprising an opaque film having no translucency formed on a surface of the translucent optical member in a predetermined pattern.

9. The electronic apparatus according to claim 5, wherein the electronic apparatus comprises a mobile phone.

10. The electronic apparatus according to claim 9, wherein the mobile phone is a clamshell phone.

* * * * *